(12) United States Patent
Kusuhara (10) Patent No.: US 8,112,107 B2
(45) Date of Patent: Feb. 7, 2012

(54) WIRELESS COMMUNICATION SYSTEM FOR UPDATING LOGIC-CIRCUIT DATA FOR IMPLEMENTING LOGIC CIRCUIT IN VARIABLE LOGIC CIRCUIT UNIT

(75) Inventor: Takashi Kusuhara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 897 days.

(21) Appl. No.: 12/145,150

(22) Filed: Jun. 24, 2008

(65) Prior Publication Data

US 2009/0191816 A1  Jul. 30, 2009

(30) Foreign Application Priority Data

Jan. 24, 2008 (JP) ................................ 2008-013909

(51) Int. Cl.
*H04B 7/00* (2006.01)
*H04B 5/00* (2006.01)

(52) U.S. Cl. .................... 455/519; 455/67.14; 455/41.1; 455/41.2; 455/41.3; 455/11.1; 455/15; 455/16

(58) Field of Classification Search .................. 455/519, 455/67.14, 41.1, 41.2, 41.3, 11.1, 15, 16
See application file for complete search history.

(56) References Cited

U.S. PATENT DOCUMENTS 6,965,568 B1 * 11/2005 Larsen .......................... 370/238
2005/0221752 A1   10/2005 Jamieson et al.
2009/0156200 A1 *  6/2009 Ishii ............................. 455/425

FOREIGN PATENT DOCUMENTS

| JP | 10-269328 A | 10/1998 |
|---|---|---|
| JP | 2002-261723 A | 9/2002 |
| JP | 2004-531058 A | 10/2004 |
| JP | 2004-357272 A | 12/2004 |
| JP | 2005-244247 A | 9/2005 |
| JP | 2005-528852 A | 9/2005 |
| JP | 2006-262227 A | 9/2006 |
| WO | WO 02/080367 A2 | 10/2002 |

* cited by examiner

*Primary Examiner* — Wen Huang
(74) *Attorney, Agent, or Firm* — Buchanan Ingersoll & Rooney PC (57) ABSTRACT

A transmission source device transmits a test signal to a transmission destination device and a transmitting device by wireless communication. The transmission destination device and the transmitting device add to a received test signal an identification number thereof and a receiving time and return the data-added test signal to the transmission source device. The transmission source device determines a communication route with a shortest communication time based on the received data-added test signal. The transmission source device transmits logic-circuit update data to the transmission destination device via the determined communication route.

11 Claims, 7 Drawing Sheets

| MAC ADDRESS | RECEIVING TIME | MAC ADDRESS | RECEIVING TIME | . . . | MAC ADDRESS | RECEIVING TIME |

| MAC ADDRESS | RECEIVING TIME | . . . | MAC ADDRESS | RECEIVING TIME | ACK FLAG |

| | |
|---|---|
| ADDRESS (P) | COMMUNICATION ROUTE CONFIRMATION DATA 1 |
| ADDRESS (P) + 1 | COMMUNICATION ROUTE CONFIRMATION DATA 2 |
| ⋮ | ⋮ |
| ADDRESS (P) + N | COMMUNICATION ROUTE CONFIRMATION DATA N |
| | TEMPORARY SAVE AREA |
| ADDRESS (D) | LOGIC-CIRCUIT UPDATE DATA 1 |
| ADDRESS (D) + 1 | LOGIC-CIRCUIT UPDATE DATA 2 |
| ⋮ | ⋮ |
| ADDRESS (D) + N | LOGIC-CIRCUIT UPDATE DATA N |

240 (upper block), 241 (lower block)

FIG.9

| DATA UNIQUE NUMBER | LOGIC-CIRCUIT DATA | RECEIVING TIME | MAC ADDRESS OF DEVICE FROM WHICH DATA HAS BEEN TRANSMITTED |
|---|---|---|---|
| 250 | 251 | 252 | 253 |

FIG.10

| DATA UNIQUE NUMBER | LOGIC-CIRCUIT DATA | MAC ADDRESS |
|---|---|---|
| 260 | 261 | 262 |

WIRELESS COMMUNICATION SYSTEM FOR UPDATING LOGIC-CIRCUIT DATA FOR IMPLEMENTING LOGIC CIRCUIT IN VARIABLE LOGIC CIRCUIT UNIT

BACKGROUND OF THE INVENTION

1. Field of the Invention

The present invention relates to a wireless communication system for updating logic-circuit data for implementing a logic circuit in a variable logic circuit unit.

2. Description of the Related Art

In recent years, a complex programmable logic device (CPLD) and a field programmable gate array (FPGA) have been widely used as a semiconductor that includes a nonvolatile memory unit or a variable logic circuit unit. A nonvolatile memory unit is a rewritable memory. On the other hand, a logical function of a logic circuit in a variable logic circuit unit is programmable.

Logic-circuit data for implementing a logic circuit in a semiconductor is stored in an internal memory or an external memory, and the logic circuit is formed by using the logic-circuit data. When the logic circuit is to be updated, the logic-circuit data stored in the internal memory or the external memory is overwritten with new logic-circuit data. Therefore, the semiconductor need not be reconfigured for update.

The new logic-circuit data is transmitted from a logic-circuit data transmission source device to the variable logic circuit unit by using a communication device dedicated for data transmission. Generally, the logic-circuit data is transmitted by wire communication, such as a joint test access group (JTAG) or a local area network (LAN), or by wireless communication, such as Wi-fi (registered trademark). Wi-fi is a standard specification for a wireless LAN. If data is transmitted by wire communication, it is possible to achieve a relatively high data transfer rate and high data reliability. However, costs for installing wiring are increased. In contrast, it is not necessary to install wiring in the wireless LAN; however, the data transfer rate is lower than that of the wire communication, and data reliability is low. Furthermore, although it is not necessary to install wiring for Wi-fi, it is expensive to arrange an access point and a receiving device.

One approach is to use a short-range, wireless, mesh network instead of a wireless LAN. A mesh network can be built at low costs. A communication protocol for the mesh network includes a radio frequency identification (RFID), Bluetooth (registered trademark), or ZigBee (registered trademark). When the short-range wireless communication is performed based on these communication protocols, it is possible to save power consumption. Furthermore, a transmitting device and a receiving device can be arranged at lower costs than that required for the wireless LAN. Therefore, it is advantageous to use a mesh network to transmit the logic-circuit data to the variable logic circuit unit.

Japanese Patent Application Laid-open No. 2004-531058 discloses a conventional technology for updating logic-circuit data for implementing a logic circuit in a variable logic-circuit unit by wireless communication. Japanese Patent Application Laid-open No. 2005-244247 discloses a conventional system for updating logic-circuit data for implementing a logic circuit in a variable logic-circuit unit by wireless communication. In the conventional system, an apparatus includes a variable logic circuit unit and a circuit that imposes restriction on update operation for the logic-circuit data.

However, in the short-range wireless mesh network, a communication distance between devices is short, and a data transfer rate is low. In addition, because it is a wireless network, the data reliability is low. Moreover, it takes a long time to complete transmission of an extremely large amount of logic-circuit data by a short-range communication system with a low transfer rate. Therefore, if the mesh network is employed as a system for transmitting the logic-circuit data, it is necessary to make improvements to achieve a high transfer rate and high reliability.

Although Japanese Patent Application Laid-open No. 2004-531058 discloses the technology for transmitting logic-circuit update data by wireless communication in order to update the logic-circuit data for the logic circuit, it does not disclose a technology for improving data reliability and a data transfer rate on the mesh network.

In the technology disclosed in Japanese Patent Application Laid-open No. 2005-244247, logic-circuit update data is transmitted to the apparatus including the variable logic circuit unit by wireless communication. The logic-circuit data is updated based on the logic-circuit update data when the restriction on the update operation is cancelled by, for example, a password transmitted to the apparatus by wireless communication. Even Japanese Patent Application Laid-open No. 2005-244247 does not disclose a technology for improving data reliability and a data transfer rate on the mesh network.

SUMMARY OF THE INVENTION

It is an object of the present invention to at least partially solve the problems in the conventional technology.

According to an aspect of the present invention, there is provided a wireless communication system for updating logic-circuit data for implementing a logic circuit in a variable logic circuit unit. The wireless communication system includes a transmission source device that transmits logic circuit update data by wireless communication; at least one transmitting device that receives the logic-circuit update data from the transmission source device by wireless communication; and a transmission destination device that includes the variable logic circuit unit. The transmission destination device receives logic-circuit update data, and updates existing logic-circuit data of the variable logic circuit unit with received logic-circuit update data. The transmission source device transmits a test signal to the transmitting device and the transmission destination device by wireless communication, the transmitting device and the transmission destination device, upon receiving the test signal, add to the test signal an identification number thereof and a receiving time of the test signal to obtain a data-added test signal, and transmit the data-added test signal by wireless communication, and the transmission source device receives the data-added test signal by wireless communication from any of the transmitting device and the transmission destination device, determines a communication route between the transmission source device and the transmission destination device via the transmitting device with a shortest communication time from among potential communication routes based on the identification number and the receiving time of each of the transmission destination device and the transmitting device obtained from received data-added test signal, and transmits the logic-circuit update data so that the logic-circuit update data is sent to the transmission destination device via the communication route.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
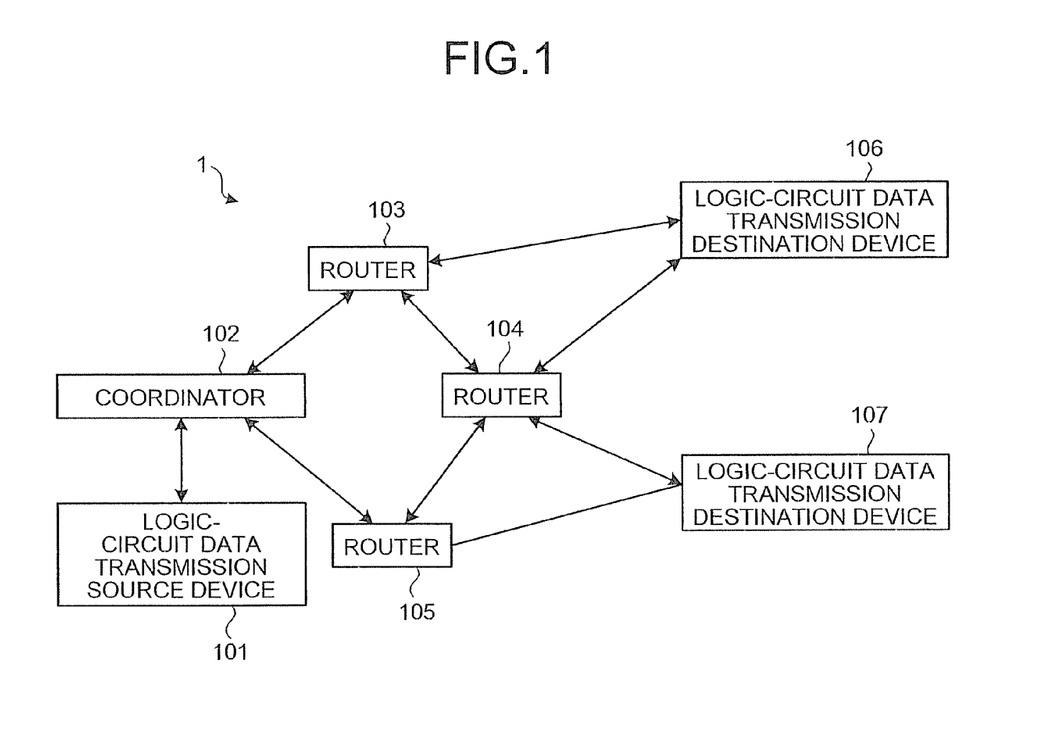
FIG. 1 is an example of a configuration of a wireless communication system according to an embodiment of the present invention.

FIG. 1 is an example of a configuration of a wireless communication system 1 for updating logic-circuit data for implementing a logic circuit in a variable logic circuit unit according to an embodiment of the present invention. The wireless communication system 1 is a mesh network. The wireless communication system 1 includes a logic-circuit data transmission source device 101, a coordinator 102, a plurality of (three in the embodiment) routers 103 to 105, and at least one (two in the embodiment) logic-circuit data transmission destination device 106, 107. The logic-circuit data transmission source device 101 and the coordinator 102 communicate with each other by wire communication. The coordinator 102, the routers 103 to 105, and the logic-circuit data transmission destination devices 106, 107 communicate with one another by short-range wireless communication. However, the coordinator 102 and the logic-circuit data transmission destination devices 106, 107, the router 103 and the router 105, and the coordinator 102 and the router 104 cannot directly communicate with each other by short-range wireless communication, because they are located apart from each other, or the like. A unique media access control (MAC) address is assigned to each of the logic-circuit data transmission source device 101, the coordinator 102, the routers 103 to 105, and the logic-circuit data transmission destination devices 106, 107.

Any communication protocol can be used for the short-range wireless communication as long as the mesh network can be constructed by using the communication protocol via the short-range wireless communication. For example, the communication protocol can be the RFID, the Bluetooth, and the ZigBee.

Although the coordinator 102 is shown as a separate device, the coordinator 102 can be incorporated in the logic-circuit data transmission source device 101. Although it is explained above that the logic-circuit data transmission source device 101 and the coordinator 102 communicate with each other by wire communication, the logic-circuit data transmission source device 101 and the coordinator 102 can communicate with each other by wireless communication.

Figure 2:
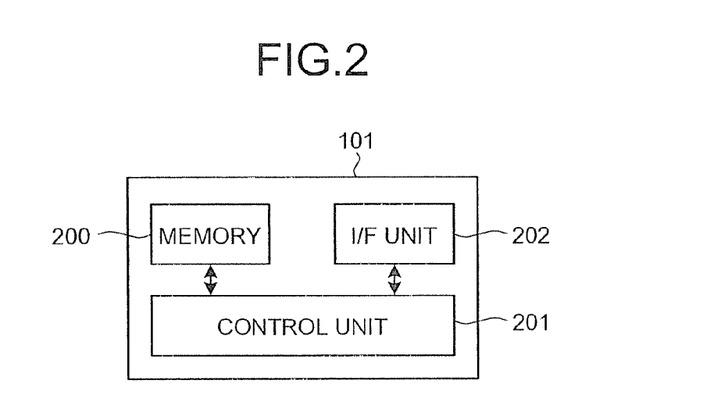
FIG. 2 is a detailed block diagram of a logic-circuit data transmission source device shown in FIG. 1.

FIG. 2 is a detailed block diagram of the logic-circuit data transmission source device 101. The logic-circuit data transmission source device 101 includes a memory 200, a control unit 201, and an interface (I/F) unit 202. The I/F unit 202 has a function as an interface for communicating with the coordinator 102. The I/F unit 202 receives data from the coordinator 102 by wire communication, and passes the received data to the control unit 201. On the other hand, the I/F unit 202 receives data from the control unit 201, and transmits the received data to the coordinator 102 by wire communication. The memory 200 stores therein various data, such as logic-circuit update data and communication route confirmation data. The logic-circuit update data is transmitted to the logic-circuit data transmission destination devices 106, 107 to update a logic circuit in each of the logic-circuit data transmission destination devices 106, 107. The communication route confirmation data contains data on a communication route through which the logic-circuit update data is transmitted to each of the logic-circuit data transmission destination devices 106, 107. The control unit 201 controls transmission and reception of various data to and from the coordinator 102 via the I/F unit 202, and performs various data processing. The control unit 201 accesses the memory 200 to write/read various data to/from the memory 200 as required.

Figure 3:
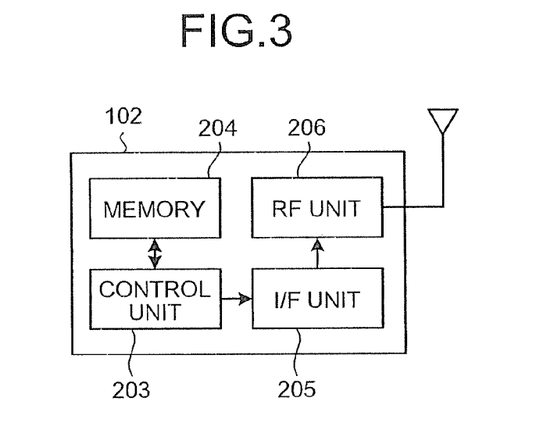
FIG. 3 is a detailed block diagram of a coordinator shown in FIG. 1.

FIG. 3 is a detailed block diagram of the coordinator 102. The coordinator 102 includes a control unit 203, a memory 204, an I/F unit 205, and a radio frequency (RF) unit 206. The I/F unit 205 has a function as an interface for communicating with the logic-circuit data transmission source device 101, and a function of relaying various data between the RF unit 206 and the control unit 203. Specifically, the I/F unit 205 receives data from the logic-circuit data transmission source device 101 by wire communication, and sends the received data to the control unit 203. On the other hand, the I/F unit 205 receives various data from the RF unit 206, and sends the received data to the control unit 203. When the I/F unit 205 receives various data from the control unit 203, the I/F unit 205 specifies an address to which the received data is to be sent, and sends the received data to the logic-circuit data transmission source device 101 or the RF unit 206 in accordance with the specified address. The RF unit 206 serves as an interface for transmitting/receiving various data to/from any or all of the routers 103 to 105 and the logic-circuit data transmission destination devices 106, 107 by short-range wireless communication. The memory 204 stores therein various data, such as a test signal, the logic-circuit update data, and the communication route confirmation data. Such data is received from the logic-circuit data transmission source device 101. The test signal will be described later in detail. The control unit 203 controls transmission and reception of various data via the I/F unit 205, and performs various data processing. The control unit 203 accesses the memory 204 to write/read various data to/from the memory 204 as required.

Figure 4:
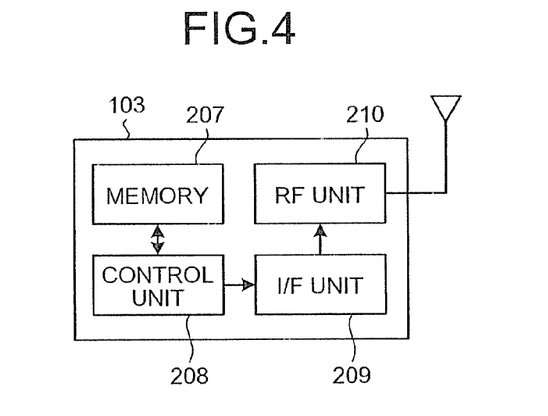
FIG. 4 is a detailed block diagram of a router shown in FIG. 1.

FIG. 4 is a detailed block diagram of the router 103. Because the routers 103 to 105 have the same configuration, only the configuration of the router 103 is described below. The router 103 includes a memory 207, a control unit 208, an I/F unit 209, and an RF unit 210. The I/F unit 209 relays data between the RF unit 210 and the control unit 208. The RF unit 210 serves as an interface for transmitting/receiving various data to/from any or all of the coordinator 102, the routers 104, 105, and the logic-circuit data transmission destination devices 106, 107 by short-range wireless communication. The memory 207 stores therein various data. The control unit 208 processes various data that is received or transmitted via the I/F unit 209. The control unit 208 accesses the memory 207 to write/read various data to/from the memory 207 as required.

Figure 5:
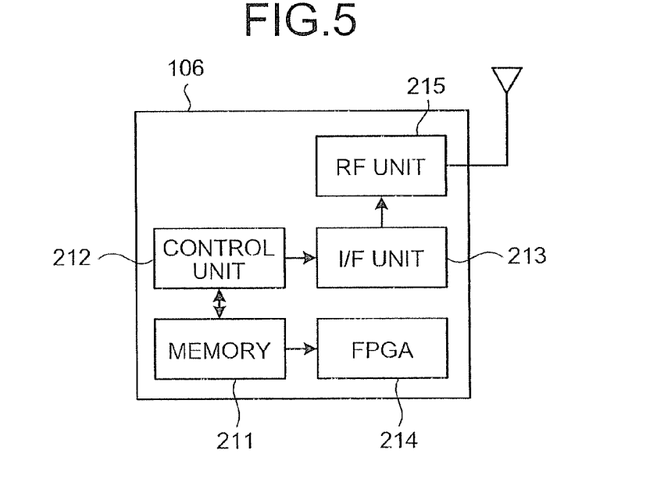
FIG. 5 is a detailed block diagram of a logic-circuit data transmission destination device shown in FIG. 1.

FIG. 5 is a detailed block diagram of the logic-circuit data transmission destination device 106. Because the logic-circuit data transmission destination devices 106, 107 have the same configuration, only the configuration of the logic-circuit data transmission destination device 106 is described below. The logic-circuit data transmission destination device 106 includes a memory 211, a control unit 212, an I/F unit 213, an FPGA 214, and an RF unit 215. The I/F unit 213 relays data between the RF unit 215 and the control unit 212. The RF unit 215 serves as an interface for transmitting/receiving various data to/from any or all of the coordinator 102, and the routers 103 to 105 by short-range wireless communication. The memory 211 stores therein various data including the logic-circuit data. The FPGA 214 is a target for which the logic-circuit data is to be updated. A logical function of the logic circuit is changed by updating the logic-circuit data for the FPGA 214. The control unit 212 processes various data that is transmitted or received via the I/F unit 213. The control unit 212 accesses the memory 211 to write/read various data to/from the memory 211. The control unit 212 also updates the logic-circuit data for the FPGA 214 with the logic-circuit update data stored in the memory 211.

In the embodiment, the FPGA is described as the variable logic circuit unit. However, the variable logic circuit unit can be any type of integrated circuit, such as the CPLD, as long as a logical function of the logic circuit can be changed by updating the logic-circuit data.

The wireless communication system 1 performs two types of operations. Firstly, the wireless communication system 1 determines a communication route for transmitting the logic-circuit update data from the logic-circuit data transmission source device 101 to each of the logic-circuit data transmission destination devices 106, 107. Secondly, the wireless communication system 1 transmits the logic-circuit update data to each of the logic-circuit data transmission destination devices 106, 107 via the determined communication route.

The control unit 201 in the logic-circuit data transmission source device 101 sends a first test signal to the I/F unit 202. The first test signal is used for checking a route through which communication can be performed, i.e., to determine a communication route. The I/F unit 202 then transmits the first test signal to the coordinator 102. The I/F unit 205 in the coordinator 102 receives the first test signal, and sends the first test signal to the control unit 203. The control unit 203 stores the first test signal in the memory 204.

The control unit 203 sends the first test signal stored in the memory 204 to the RF unit 206 via the I/F unit 205. The RF unit 206 transmits the first test signal to the routers (the routers 103 to 105).

The RF unit 210 in the router (the routers 103 and 104 in the embodiment) receives the first test signal, and sends the first test signal to the control unit 208 via the I/F unit 209. The control unit 208 adds to the first test signal the MAC address of the router and a receiving time of the first test signal. The receiving time means a time at which a given signal is received in a given device. The control unit 208 then sends the modified first test signal, i.e., the first test signal with the MAC address and the receiving time added thereto, to the RF unit 210 via the I/F unit 209. The RF unit 210 transmits the modified first test signal to other router(s) or the logic-circuit data transmission destination device 106 or 107.

Figure 6:
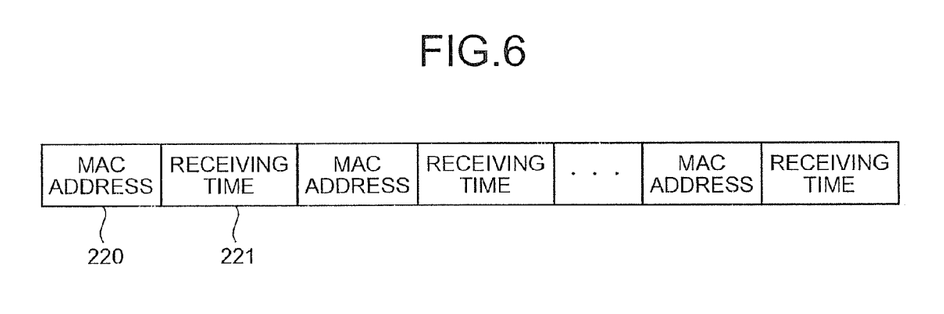
FIG. 6 is a schematic diagram for explaining a data structure of a first test signal according to the embodiment.

FIG. 6 is a schematic diagram for explaining a data structure of the first test signal. When a router transmits the first test signal, a MAC address 220 of the transmitting router and a receiving time 221 are inevitably added to the first test signal.

When the RF unit 215 of the logic-circuit data transmission destination device (the logic-circuit data transmission destination device 106 or 107) receives the first test signal, the RF unit 215 sends the first test signal to the control unit 212 via the I/F unit 213. The control unit 212 then adds to the first test signal the MAC address of the logic-circuit data transmission destination device, the receiving time of the first test signal, and an acknowledgement (ACK) flag. The ACK flag indicates that reception of the first test signal is completed. The control unit 212 sends the modified first test signal, i.e., the first test signal with the MAC address, the receiving time, and the ACK flag added thereto, to the RF unit 215 via the I/F unit 213. The RF unit 215 then transmits the modified first test signal to the coordinator 102 via the routers 103 to 105.

The first test signal to which an ACK flag has been added will be called as a second test signal in the following explanation. When the routers 103 to 105 receive the second test signal, the routers 103 to 105 transmit the second test signal to the next device as is, i.e., without adding the MAC address or the receiving time to the second test signal.

Figure 7:
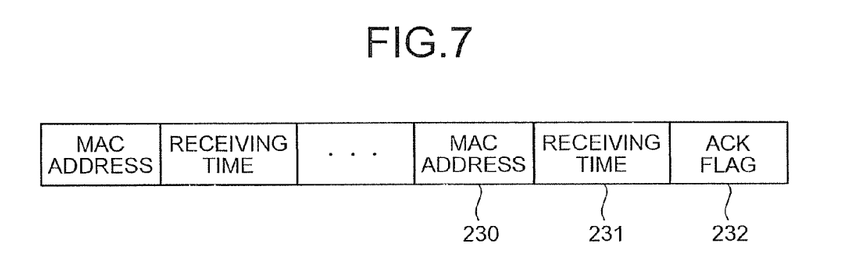
FIG. 7 is a schematic diagram for explaining a data structure of a second test signal according to the embodiment.

FIG. 7 is a schematic diagram for explaining a data structure of the second test signal. The second test signal contains a MAC address 230, a receiving time 231, and an ACK flag 232 of the logic-circuit data transmission destination device 106 or 107 in addition to log information that includes the MAC addresses and receiving times of the routers through which the first test signal was transmitted. Presence of the ACK flag 232 indicates that reception of the first test signal is completed.

The control unit 203 in the coordinator 102 enters into a standby state for a predetermined period after the RF unit 206 transmits the first test signal. If the RF unit 206 receives any second test signals while the control unit 203 is in the standby state, the RF unit 206 sends all of the received second test signals to the I/F unit 205 and the control unit 203, and the control unit 203 stores those second test signals in the memory 204. When a predetermined period elapses after the RF unit 206 transmits the first test signal, the control unit 203 transmits all of the second test signals stored in the memory 204 to the logic-circuit data transmission source device 101 via the I/F unit 205 and the RF unit 206. If no second test signal is stored in the memory 204 when the predetermined period elapses, the control unit 203 determines this as a time-out error, and transmits to the logic-circuit data transmission source device 101 a negative acknowledgement signal that indicates that data cannot be transmitted.

When the I/F unit 202 in the logic-circuit data transmission source device 101 receives the second test signal, the control unit 201 receives that second test signal and temporarily stores it in the memory 200. The control unit 201 determines a communication route based on contents of data in the second test signal. The logic-circuit update data is to be transmitted to the logic-circuit data transmission destination devices 106, 107 via the determined communication route in order to update the logic-circuit data thereof. The communication route is determined in either one of two ways: one communication route is determined for one logic-circuit data transmission destination device, or a plurality of communication routes is determined for one logic-circuit data transmission destination device.

When determining one communication route for one logic-circuit data transmission destination device, the control unit 201 in the logic-circuit data transmission source device 101 determines, based on the MAC address 220 and the receiving time 221 in the received second test signal, a path through which data can be transmitted from the coordinator 102 to each of the logic-circuit data transmission destination devices 106, 107 in the shortest communication time. The control unit 201 sets the determined path as a communication route.

When determining a plurality of communication routes for one logic-circuit data transmission destination device, the control unit 201 determines a plurality of paths through which data can be transmitted from the coordinator 102 to each of the logic-circuit data transmission destination devices 106, 107 in the shortest communication time. The control unit 201 sets the determined paths as communication routes. It is allowable to transmit the logic-circuit update data to one logic-circuit data transmission destination device in such a manner that each of the communication routes receives the whole logic-circuit update data. Alternatively, the logic-circuit update data can be divided into fragments as many as the communication routes, and each of the fragments can be transmitted via a corresponding one of the communication routes. Moreover, the above-described two methods can be combined. It is allowable to divide the logic-circuit update data into a plurality of fragments having different data sizes so that a uniform network load is to be born by each of the communication routes. A transfer rate of each of the communication routes is calculated based on the second test signal. Data of larger size is transmitted via a communication route with a higher transfer rate. Data of smaller size is transmitted via a communication route with a lower transfer rate.

The control unit 201 assigns a data unique number to the logic-circuit update data. The data unique number is unique to logic-circuit update data that is transmitted to each of the logic-circuit data transmission destination devices 106, 107. If the logic-circuit update data is divided into fragments, the data unique number is unique to each of the fragments of the logic-circuit update data. When a plurality of pieces of the same logic-circuit update data is transmitted to one logic-circuit data transmission destination device via different communication routes, the same data unique number is assigned to the pieces of the logic-circuit update data. Hereinafter, the logic-circuit update data includes a divided fragment of the logic-circuit update data unless otherwise stated.

The control unit 201 creates communication route confirmation data from the determined communication route and the data unique number of the logic-circuit update data to be transmitted via the determined communication route. The communication route confirmation data contains a plurality of MAC addresses of devices on the communication route and data unique number for specifying a target logic-circuit update data. The devices on the communication route are, specifically, some of the coordinator 102, the routers 103 to 105, and the logic-circuit data transmission destination devices 106, 107. The MAC addresses are arranged in an order of the devices through which the communication route confirmation data is transmitted from the logic-circuit data transmission source device 101 to the logic-circuit data transmission destination devices 106, 107.

The control unit 201 transmits the created communication route confirmation data to the coordinator 102 via the I/F unit 202. The control unit 203 in the coordinator 102 receives the communication route confirmation data via the I/F unit 205. The control unit 203 stores the communication route confirmation data in the memory 204. The control unit 203 refers to the MAC address contained in the communication route confirmation data to read information indicative of the next router to which the logic-circuit update data is to be transmitted, and transmits the communication route confirmation data to the next router via the I/F unit 205 and the RF unit 206. When the control unit 208 in the next router receives the communication route confirmation data via the I/F unit 209 and the RF unit 210, the control unit 208 stores the communication route confirmation data in a predetermined area of the memory 207. The control unit 208 also refers to the MAC address contained in the communication route confirmation data to read information indicative of the next device to which the logic-circuit update data is to be transmitted, and transmits the communication route confirmation data to the next device via the I/F unit 205 and the RF unit 206. The communication route confirmation data is repeatedly transmitted by the routers 103 to 105 until the communication route confirmation data is transmitted to the logic-circuit data transmission destination device 106 or 107.

Figure 8:
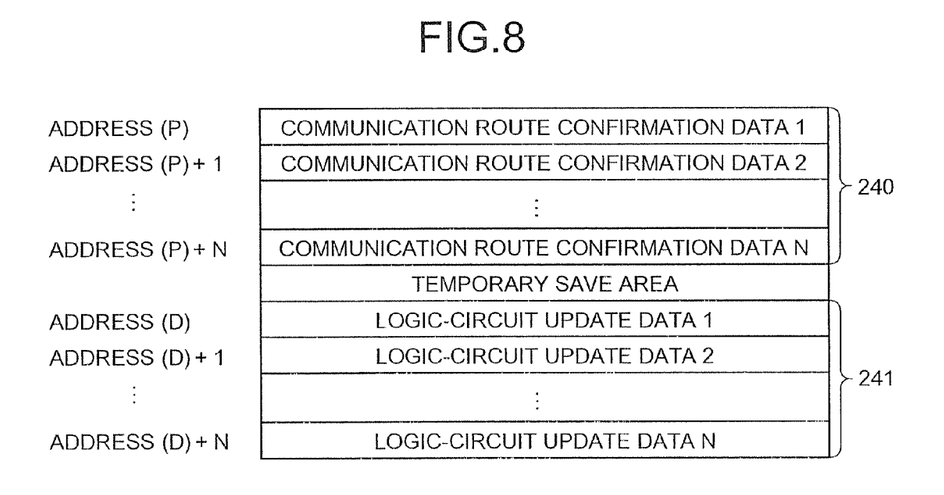
FIG. 8 is a schematic diagram for explaining a memory structure of a memory of the router.

FIG. 8 is a schematic diagram for explaining a memory structure of the memory 207. The memory 207 contains an area 240, an area 241, and a temporary save area. The communication route confirmation data is stored in the area 240. The communication route confirmation data contains data about the communication route in which the router is included. The logic-circuit update data transmitted by the router is stored in the area 241 as a log. Any other data is stored in the temporary save area. All pieces of the communication route confirmation data transmitted to the router is stored in the area 240. The logic-circuit update data stored in the area 241 as a log will be described later in detail. Temporary data, such as the first test signal, is stored in the temporary save area, and the data stored in the temporary save area is deleted or overwritten at a predetermined timing.

Hereinafter, operation of transmitting various data between components of the mesh network is explained. In the following description, operation performed by the I/F units 202, 205, 209, 213 and the RF units 206, 210, 215 in the coordinator 102, the routers 103 to 105, the logic-circuit data transmission destination devices 106, 107 are omitted.

The logic-circuit data transmission source device 101 transmits the logic-circuit update data with the data unique number assigned thereto to the coordinator 102. When the coordinator 102 receives the logic-circuit update data from the logic-circuit data transmission source device 101, the control unit 203 stores the received logic-circuit update data in the memory 204. The control unit 203 also reads the communication route confirmation data containing the data unique number of the received logic-circuit update data from the memory 204. The control unit 203 checks the next router to which the logic-circuit update data is to be transmitted from the read communication route confirmation data. The control unit 203 then adds the MAC address of the coordinator 102 to the received logic-circuit update data, and the coordinator 102 transmits the logic-circuit update data to the next router.

After the coordinator 102 transmits the logic-circuit update data to the next router, the control unit 203 enters into a standby state until the coordinator 102 receives the ACK signal from the next router. If the coordinator 102 does not receive the ACK signal from the next router within a predetermined time, the coordinator 102 retransmits the logic-circuit update data. If the coordinator 102 does not receives the ACK signal from the next router within a predetermined time after retransmission of the logic-circuit update data, the control unit 203 determines that the logic-circuit update data cannot be transmitted to the router. The coordinator 102 then retransmits the first test signal to determine a communication route again.

When the next router receives the logic-circuit update data, the control unit 208 checks the device that has transmitted the logic-circuit update data to the router from the MAC address in the logic-circuit update data. The router then transmits the ACK signal to the device. The control unit 208 adds to the logic-circuit update data a receiving time of the logic-circuit update data, and stores the logic-circuit update data in the area 241 of the memory 207 as a log.

Figure 9:
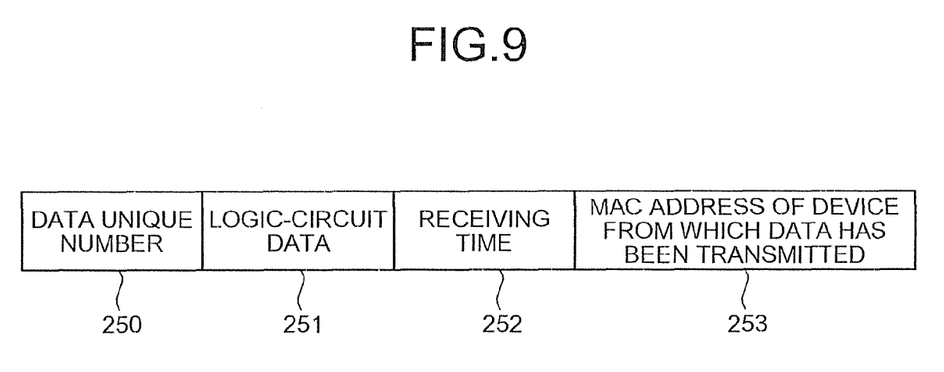
FIG. 9 is a schematic diagram for explaining a data structure of logic-circuit update data stored in the memory.

FIG. 9 is a schematic diagram for explaining a data structure of the logic-circuit update data stored in the area 241 as a log. The logic-circuit update data contains logic-circuit data 251, a data unique number 250, a receiving time 252, and a MAC address 253. The logic-circuit data 251 is a body of the logic-circuit update data. The MAC address 253 is a MAC address of a device from which the logic-circuit update data has been transmitted. If the logic-circuit update data is transmitted from the coordinator 102, the MAC address 253 is the MAC address of the coordinator 102.

Figure 10:
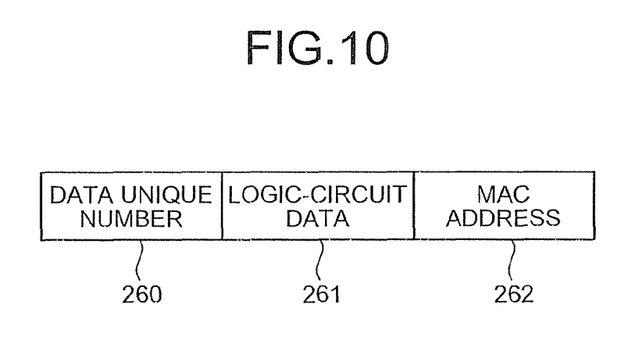
FIG. 10 is a schematic diagram for explaining a data structure of logic-circuit update data to be transmitted by the router.

When the router receives the logic-circuit update data, the control unit 208 checks the data unique number contained in the logic-circuit update data, and refers to the communication route confirmation data containing that data unique number from the memory 207. Thus, the control unit 208 acquires information about the next device to which the logic-circuit update data is to be transmitted. The control unit 208 overwrites the MAC address written in the logic-circuit update data with the MAC address of the router, i.e., the MAC address of the device from which the logic-circuit update data has been transmitted to the router. The control unit 208 then transmits the logic-circuit update data to the next device, i.e., the router or the logic-circuit data transmission destination device 106 or 107. FIG. 10 is a schematic diagram for explaining a data structure of the logic-circuit update data to be transmitted by the router. The logic-circuit update data contains a data unique number 260, logic-circuit data 261, and a MAC address 262. The logic-circuit data 261 is the body of the logic-circuit update data. The MAC address 262 is the new MAC address that was overwritten on the old MAC address by the router as described above.

After the router transmits the logic-circuit update data to the router or the logic-circuit data transmission destination device 106 or 107, the control unit 208 enters into a standby state until the router receives the ACK signal from the router or the logic-circuit data transmission destination device 106 or 107. If the router does not receive the ACK signal within a predetermined period, the router retransmits the logic-circuit update data to the router or the logic-circuit data transmission destination device 106 or 107. Thereafter the control unit 208 enters into a standby state for a predetermined period. If the router does not receive the ACK signal within the predetermined period, the control unit 208 determines that it is impossible to transmit the logic-circuit update data to the router or the logic-circuit data transmission destination device 106 or 107. The control unit 208 then refers to the MAC address contained in the communication route confirmation data stored in the memory 207, thereby reading information indicative of the device from which the logic-circuit update data has been transmitted to the router. The control unit 208 then transmits a data transmission error to the device. The data transmission error is transmitted to the coordinator 102 via the routers 103 to 105. When the coordinator 102 receives the data transmission error, the control unit 203 determines that it is impossible to transmit the logic-circuit update data via the communication route. The coordinator 102 retransmits the first test signal to determine a communication route again.

When the logic-circuit data transmission destination devices 106, 107 receive the logic-circuit update data, the control unit 212 of each of the logic-circuit data transmission destination devices 106, 107 checks from the MAC address 262 the device that has transmitted the logic-circuit update data to each of the logic-circuit data transmission destination devices 106, 107. Each of the logic-circuit data transmission destination devices 106, 107 transmits the ACK signal to the device.

As described above, the logic-circuit update data is transmitted to the logic-circuit data transmission destination devices 106, 107 through the routers 103 to 105 via a predetermined communication route. If the logic-circuit update data cannot be transmitted via the predetermined communication route, the coordinator 102 retransmits the first test signal to determine a communication route through which the logic-circuit update data can be transmitted to the logic-circuit data transmission destination devices 106, 107.

If one communication route is determined for one logic-circuit data transmission destination device, the logic-circuit data transmission destination devices 106, 107 perform operation as described below. When the logic-circuit data transmission destination devices 106, 107 receive the logic-circuit update data, the control unit 212 of each of the logic-circuit data transmission destination devices 106, 107 stores the logic-circuit update data in the memory 211. Each of the logic-circuit data transmission destination devices 106, 107 transmits the ACK signal to the router from which the logic-circuit update data has been transmitted to each of the logic-circuit data transmission destination devices 106, 107. The logic-circuit data transmission destination devices 106, 107 also transmit a logic-circuit data ACK signal to the coordinator 102. The logic-circuit data ACK signal indicates that the logic-circuit update data has been received properly.

If a plurality of communication routes is determined for one logic-circuit data transmission destination device, and divided fragments of the logic-circuit update data are transmitted to the logic-circuit data transmission destination device via the communication routes, the logic-circuit data transmission destination devices 106, 107 perform operation as described below. When the logic-circuit data transmission destination device 106 or 107 receives all of the divided fragments of the logic-circuit update data, the control unit 212 combines the divided fragments. Thus, the coordinator 102 divides the logic-circuit update data into fragments, and then transmits the divided fragments of the logic-circuit update data via the communication routes. Therefore, it is possible to reduce time required for transmitting a large amount of logic-circuit update data compared with the case that the logic-circuit update data is transmitted via one communication route.

The control unit 212 then determines whether the combined logic-circuit update data is valid. When the combined logic-circuit update data is valid, the control unit 212 stores the combined logic-circuit update data in the memory 211. The control unit 212 also causes the logic-circuit data ACK signal to be transmitted to the coordinator 102 via one of the communication routes through which the divided fragments of the logic-circuit update data were transmitted. When the control unit 212 determines that the combined logic-circuit update data is not valid, the control unit 212 causes re-transmission request data to be transmitted to the router from which the divided fragment has been transmitted to the logic-circuit data transmission destination device 106, 107. The re-transmission request data contains the divided fragment of the logic-circuit update data. In this manner, the control unit 212 requests the router to retransmit the divided fragment.

When the router receives the re-transmission request data, the control unit 208 compares the logic-circuit data 251 stored in the area 241 with the logic-circuit data contained in the received re-transmission request data. If the logic-circuit data 251 is different from the logic-circuit data contained in the re-transmission request data, the control unit 208 causes the logic-circuit update data to be transmitted to the logic-circuit data transmission destination device from which the re-transmission request data has been transmitted to the router. If the logic-circuit data 251 is the same as the logic-circuit data contained in the re-transmission request data, the control unit 208 causes the re-transmission request data to be transmitted to the previous router or the coordinator 102 from which the logic-circuit update data has been transmitted to the current router.

If a plurality of pieces of the same logic-circuit update data is transmitted via a plurality of communication routes, it is possible that the pieces of the logic-circuit update data having the same data unique number are transmitted to one router or one logic-circuit data transmission destination device through different routers. In such a case, the router or the logic-circuit data transmission destination device operates as describe below.

Figure 11:
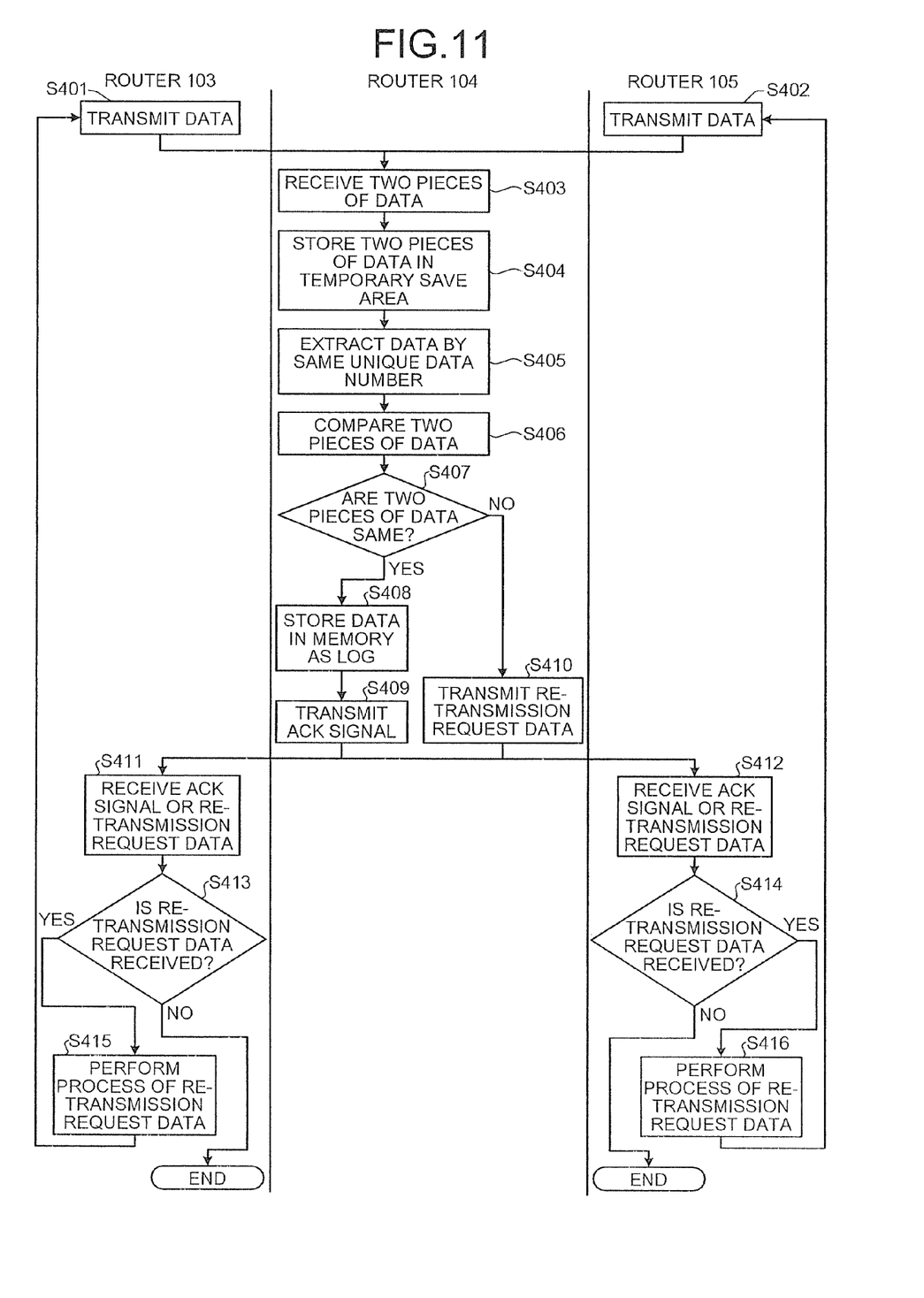
FIG. 11 is a flowchart of operation performed by the wireless communication system when two pieces of the logic-circuit update data having the same data unique number are transmitted from two routers to one router.

Assume that two pieces of logic-circuit update data having the same data unique number are transmitted to one router through two routers. FIG. 11 is a flowchart of operation performed by the wireless communication system 1 when the two pieces of the logic-circuit update data having the same data unique number are transmitted from the routers 103 and 104 to the router 104.

Each of the routers 103, 105 transmits the logic-circuit update data having the same data unique number to the router 104 (Steps S401, S402). The router 104 receives two pieces of the logic-circuit update data having the same data unique number from the routers 103, 105 (Step S403). The router 104 stores the two pieces of the logic-circuit update data in the temporary save area of the memory 207 (Step S404). The control unit 208 in the router 104 extracts the logic-circuit data 261 by the same data unique number from logic-circuit update data stored in the temporary save area (Step S405). In this case, the two pieces of the logic-circuit update data having the same data unique number stored at Step S404 are extracted as the logic-circuit data 261. The control unit 208 then compares the two pieces of the logic-circuit data 261 (Step S406). The control unit 208 determines whether the two pieces of the logic-circuit data 261 are the same based on a result of comparison (Step S407). If the control unit 208 determines that the pieces of the logic-circuit data 261 are not the same (No at Step S407), the control unit 208 causes a re-transmission request data to be transmitted to the routers 103, 105 (Step S410). The re-transmission request data is the same as the one described in the case that the divided fragments of the logic-circuit update data are transmitted.

When the control unit 208 determines that the pieces of the logic-circuit data 261 are the same (Yes at Step S407), the control unit 208 stores in the area 241 the logic-circuit update data received from the routers 103, 105 with a receiving time added thereto (Step S408). The control unit 208 then overwrites the MAC address 262 of any one of the pieces of the logic-circuit update data with the MAC address of the router 104, and causes the logic-circuit update data to be transmitted to the next device. The control unit 208 also transmits the ACK signal to the routers 103, 105 (Step S409). When the routers 103, 104 receive the ACK signal or the re-transmission request data from the router 104 (Steps S411, S412), the control unit 208 of each of the routers 103, 105 determines whether the re-transmission request data is received (Steps S413, S414). When the control unit 208 determines that the re-transmission request data is received (Yes at Steps S413, S414), the control unit 208 performs the operation described in the case that the divided fragments of the logic-circuit update data is transmitted (Steps S415, S416). When the control unit 208 of each of the routers 103, 105 determines that the re-transmission request data is not received (No at Steps S413 and S414), the process control goes to end.

Although it is explained above that one router receives two pieces of the logic-circuit update data having the same data unique number, it is possible that the logic-circuit data transmission destination device receives a plurality of pieces of the logic-circuit update data having the same data unique number. In such a case, the logic-circuit data transmission destination device skips Step S408 shown in FIG. 11, and transmits the logic-circuit data ACK signal to the coordinator 102 and the ACK signal to the routers 103, 105 at Step S409.

Figure 12:
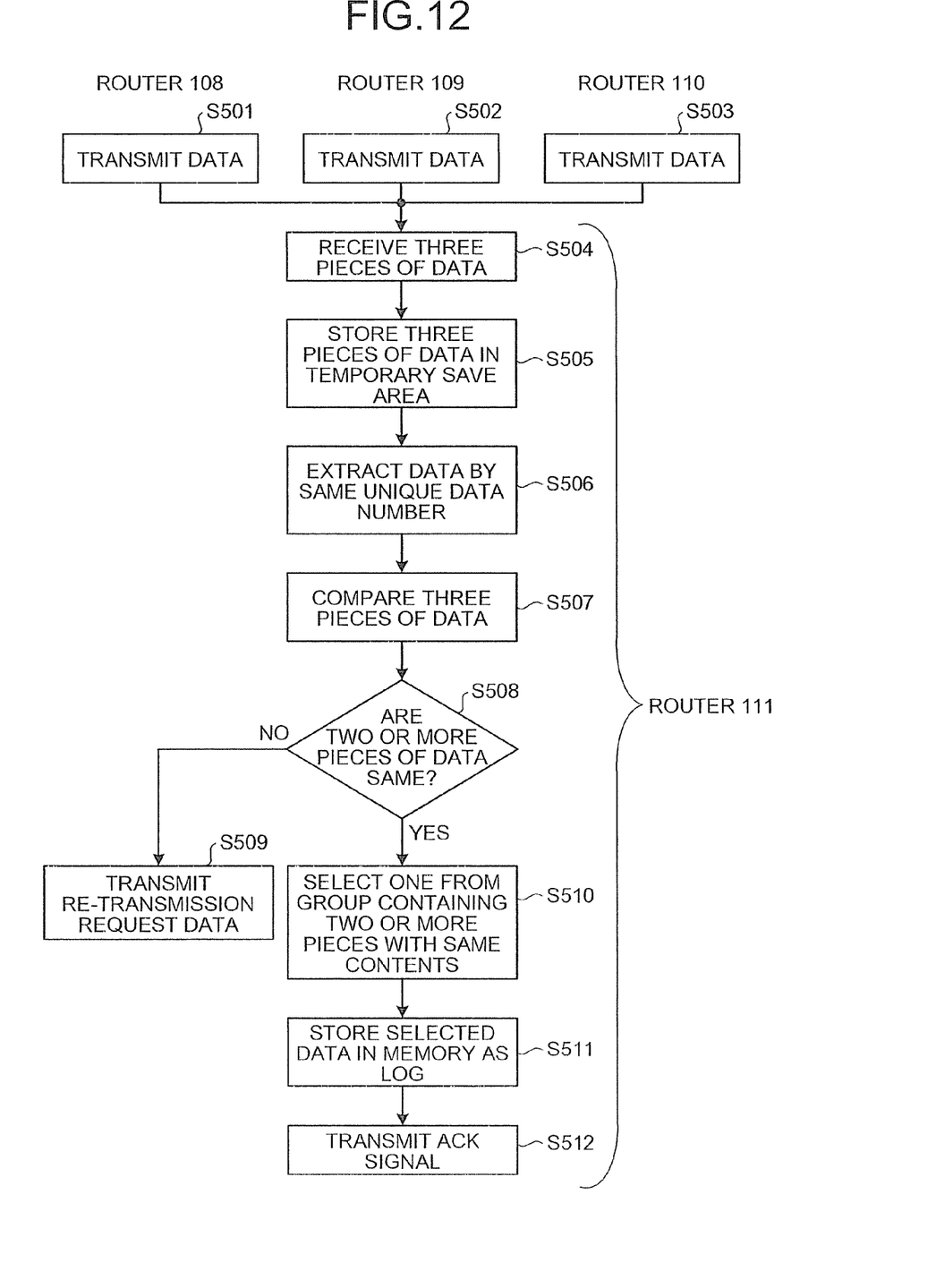
FIG. 12 is a flowchart of operation performed by the wireless communication system when three pieces of logic-circuit update data having the same data unique number are transmitted from three routers to one router.

The wireless communication system 1 shown in FIG. 1 does not assume that one router receives three or more pieces of the same logic-circuit update data from three or more routers. However, such transmission can be performed in a larger-scale wireless communication system for updating logic-circuit data for implementing a logic circuit in a valuable logic circuit unit. FIG. 12 is a flowchart of operation performed by the wireless communication system when three pieces of logic-circuit update data having the same data unique number are transmitted from routers 108 to 110 to a router 111. The routers 108 to 111 have the same configuration and function as the routers 103 to 105.

Each of the routers 108 to 110 transmits the logic-circuit update data having the same data unique number to the router 111 (Steps S501, S502, and S503). The router 111 receives three pieces of the logic-circuit update data having the same data unique number from the routers 108 to 110 (Step S504). The control unit 208 in the router 111 stores the three pieces of the logic-circuit update data in the temporary save area of the memory 207 (Step S505). The control unit 208 extracts the logic-circuit data 261 by the same data unique number from logic-circuit update data stored in the temporary save area (Step S506). In this case, the three pieces of the logic-circuit update data having the same data unique number stored at Step S505 are extracted as the logic-circuit data 261. The control unit 208 then compares the three pieces of the logic-circuit data 261 (Step S507). The control unit 208 determines whether two or more pieces of the logic-circuit data 261 are the same based on a result of comparison (Step S508). If the control unit 208 determines that each of three pieces of the logic-circuit data 261 is different from each other (No at Step S508), the control unit 208 causes re-transmission request data to be transmitted to the routers 108 to 110 (Step S509). When each of the routers 108 to 110 receives the re-transmission request data, the routers 108 to 110 retransmit the logic-circuit update data to the router 111. When the control unit 208 determines that two or more pieces of the logic-circuit data 261 are the same (Yes at Step S508), the control unit 208 selects one from a group containing the two or more pieces of the logic-circuit data 261 with the same contents (Step S510). The control unit 208 then adds a receiving time to the logic-circuit update data containing the selected logic-circuit data 261, and stores the logic-circuit update data in the area 241 of the memory 207 (Step S511). The control unit 208 then overwrites the MAC address 262 contained in the logic-circuit update data selected at Step S510 with the MAC address of the router 111. The control unit 208 transmits the logic-circuit update data to the next device. The control unit 208 transmits the ACK signal to the routers 108 to 110 (Step S512), and the process control goes to end.

Although it is explained above that one router receives three pieces of logic-circuit update data having the same data unique number, it is possible that the logic-circuit data transmission destination device receives three pieces of logic-circuit update data having the same data unique number. In such a case, the logic-circuit data transmission destination device transmits the logic-circuit data ACK signal to the coordinator 102 and the ACK signal to the routers 108 to 110 at Step S512 shown in FIG. 12.

As described above with reference to FIGS. 11 and 12, when a plurality of pieces of logic-circuit update data having the same data unique number is transmitted via a plurality of communication routes, it is possible that the router cannot receive the pieces of logic-circuit update data at the same time due to transmission delay or the like. Therefore, the router can receive one of the pieces of the logic-circuit update data after the router has received other one of the pieces of the logic-circuit update data, and transmitted the other one to the next device.

Figure 13:
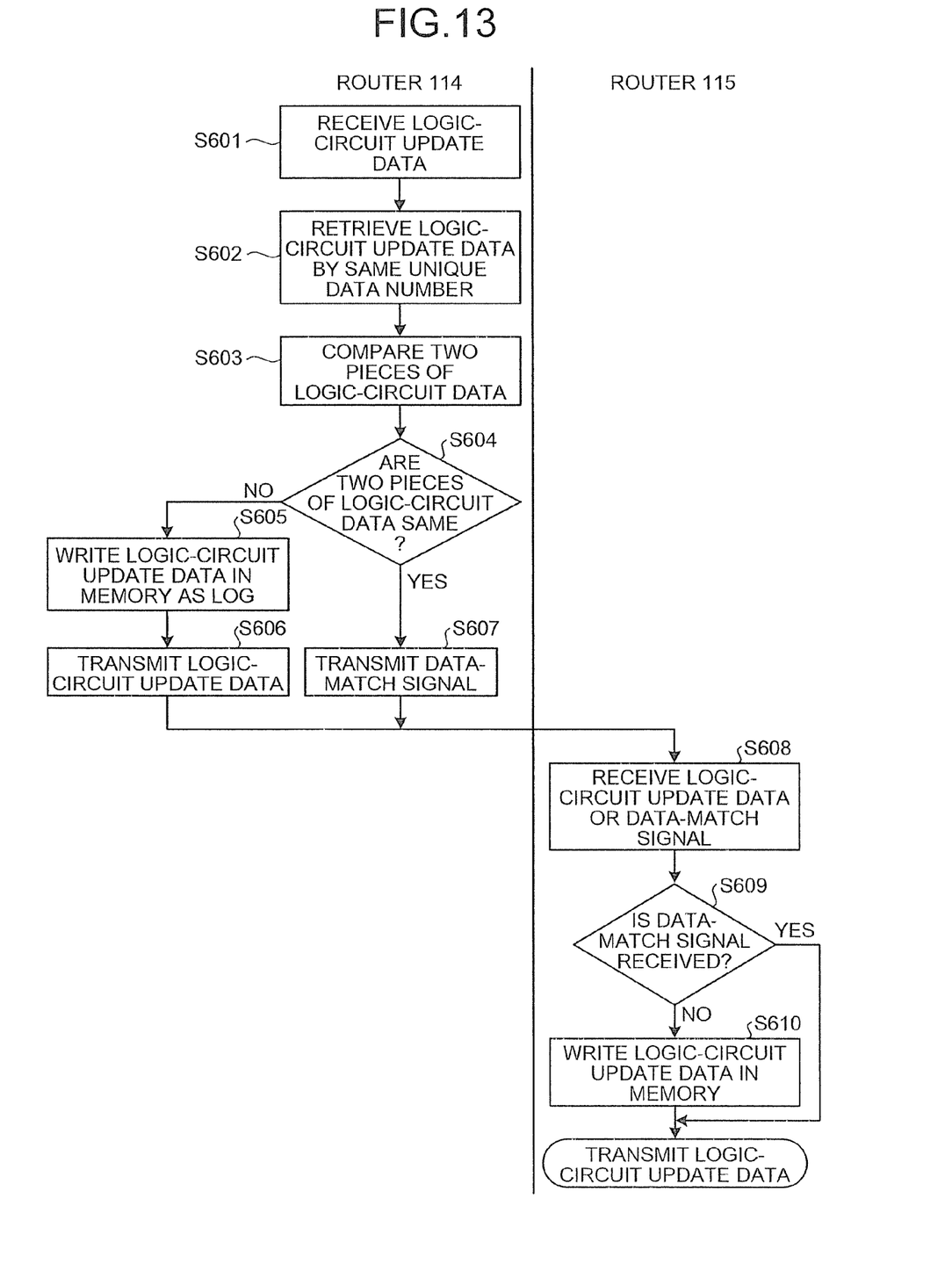
FIG. 13 is a flowchart of operation performed by the wireless communication system when two pieces of the logic-circuit update data having the same data unique number are not transmitted to one router at the same time.

FIG. 13 is a flowchart of operation performed by the wireless communication system when two pieces of the logic-circuit update data having the same data unique number are not transmitted to one router at the same time. The communication route is determined in such a manner that the two pieces of the logic-circuit update data having the same data unique number are transmitted to a router 114 via routers 112, 113, and the pieces of the logic-circuit update data are transmitted to the router 105 after the router 114. The router 114 receives the logic-circuit update data from the router 112, and transmits the received logic-circuit update data to the next device. Afterward, the router 114 receives the logic-circuit update data from the router 113.

The router 114 receives the logic-circuit update data from the router 113 (Step S601). The control unit 208 in the router 114 then retrieves logic-circuit update data by the data unique number same as that of the received logic-circuit update data from the area 241 of the memory 207 (Step S602). It is assumed that the logic-circuit update data received from the router 112 has been stored in the area 241, the control unit 208 extracts that logic-circuit update data having the same data unique number from the area 241. The control unit 208 then compares two pieces of the logic-circuit data 261 contained in the logic-circuit update data received from the router 113 and the extracted logic-circuit update data (Step S603). The control unit 208 determines whether the two pieces of the logic-circuit data 261 are the same based on a result of comparison (Step S604). When the control unit 208 determines that the pieces of the logic-circuit data 261 are not the same (No at Step S604), the control unit 208 overwrites the logic-circuit update data stored in the area 241 as a log with the logic-circuit update data received from the router 113 (Step S605). The logic-circuit update data stored in the area 241 as a log corresponds to the logic-circuit update data received from the router 112. Afterwards, the control unit 208 overwrites the MAC address 262 contained in the logic-circuit update data received from the router 113 with the MAC address of the router 104. The control unit 208 then transmits the logic-circuit update data to a router 115 (Step S606). When the control unit 208 determines that the pieces of the logic-circuit data 261 are the same (Yes at Step S604), the router 114 transmits a data-match signal to the router 115 (Step S607). The data-match signal indicates that the pieces of the logic-circuit data 261 are the same. When the router 115 receives the logic-circuit update data or the data-match signal from the router 114 (Step S608), the control unit 208 in the router 115 determines whether the data-match signal is received (Step S609). When the control unit 208 determines that the data-match signal is not received (No at Step S609), the control unit 208 performs the same operation as that performed by the router 114 at Steps S602 to S605, thereby overwriting the logic-circuit update data stored in the area 241 as a log with the logic-circuit update data received from the router 114 (Step S610). The control unit 208 then causes the logic-circuit update data to be transmitted to the next device. When the control unit 208 determines that the data-match signal is received (Yes at Step S609), the control unit 208 causes the data-match signal to be transmitted to the next device.

When the logic-circuit update data is properly transmitted to the logic-circuit data transmission destination devices 106, 107, and the coordinator 102 receives the logic-circuit data ACK signal from the logic-circuit data transmission destination devices 106, 107, the control unit 201 in the coordinator 102 transmits a start signal for updating the logic-circuit data to the logic-circuit data transmission destination devices 106, 107. The control unit 201 calculates a communication time required for transmitting data via each of the communication routes from the MAC address and the receiving time that are contained in the second test signal stored in the memory 204. The control unit 201 shifts a transmission time of the start signal for each of the logic-circuit data transmission destination devices 106, 107 based on the calculated communication time, so that the start signal reaches each of the logic-circuit data transmission destination devices 106, 107 at the same time.

When each of the logic-circuit data transmission destination devices 106, 107 receives the start signal, the control unit 212 of each of the logic-circuit data transmission destination devices 106, 107 transmits to the FPGA 214 the logic-circuit data contained in the logic-circuit update data stored in the memory 211, and writes the logic-circuit data in the FPGA 214. In this manner, if the logic-circuit update data is transmitted to a plurality of logic-circuit data transmission destination devices, the logic-circuit data of each of the logic-circuit data transmission destination devices can be updated at the same time.

As described above, in the wireless communication system 1 according to the embodiment, data is transmitted via a communication route through which data can be transmitted at the highest transfer rate among communication routes in the short-range wireless mesh network. Thus, it is possible to transmit the logic-circuit update data to the logic-circuit data transmission destination device at as high a transfer rate as possible. Furthermore, when data cannot be transmitted via the determined communication route, other communication route is determined. In this manner, it is possible to transmit the logic-circuit update data to the logic-circuit data transmission destination device without fail. It is possible to improve reliability of data transmission.

It is explained above that the communication route is estimated before the logic-circuit update data is transmitted to the logic-circuit data transmission destination device. However, communication routes can be repeatedly determined at a predetermined time interval. In this manner, it is possible to reduce a frequency of determining a communication route in response to the data transmission error. Thus, it is possible to reduce load on the network.

Three methods are described above for transmitting the logic-circuit update data via a communication route. That is:
1) one communication route is determined for one logic-circuit data transmission destination device,
2) a plurality of communication routes is determined for one logic-circuit data transmission destination device, and divided fragments of the logic-circuit update data are transmitted via the communication routes, and
3) a plurality of communication routes is determined for one logic-circuit data transmission destination device, and a plurality of pieces of the same logic-circuit update data is transmitted via the communication routes.

If the divided fragments of the logic-circuit update data are transmitted to one logic-circuit data transmission destination device via the communication routes, it is possible to further distribute communication load on the network compared with the case that one communication route is determined for one logic-circuit data transmission destination device. Thus, various data can be transmitted at a higher transfer rate. Furthermore, when the pieces of the same logic-circuit update data are transmitted to one logic-circuit data transmission destination device via the communication routes, the pieces of the same logic-circuit update data are compared to each other in order to check an error in the logic-circuit update data. Thus, it is possible to further improve reliability of data transmission compared to the case that one communication route is determined for one logic-circuit data transmission destination device.

Moreover, in the case the pieces of the same logic-circuit update data are transmitted to one logic-circuit data transmission destination device via the communication routes, when the router receives the logic-circuit update data after the router transmitted the same logic-circuit update data to the next device, the router compares contents of the logic-circuit update data stored in the memory as a log with contents of the received logic-circuit update data. When the two pieces of the logic-circuit update data are the same, the router does not transmit the received logic-circuit update data to the next device. Thus, it is possible to reduce load on the network.

According to an aspect of the present invention, it is possible to transmit the logic-circuit update data to the logic-circuit data transmission destination device at the highest possible transfer rate. Furthermore, it is possible to transmit the logic-circuit update data to the logic-circuit data transmission destination device without fail. It is possible to improve reliability of data transmission.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication system for updating logic-circuit data for implementing a logic circuit in a variable logic circuit unit, the wireless communication system comprising:
a transmission source device configured to transmit logic circuit update data by wireless communication;
at least one transmitting device configured to receive the logic-circuit update data from the transmission source device by wireless communication; and
a transmission destination device that includes the variable logic circuit unit, wherein the transmission destination device is configured to receive logic-circuit update data, and updates existing logic-circuit data of the variable logic circuit unit with received logic-circuit update data,
wherein the transmission source device is further configured to transmit a test signal to the transmitting device and the transmission destination device by wireless communication, the transmitting device and the transmission destination device, upon receiving the test signal, add to the test signal an identification number thereof and a receiving time of the test signal to obtain a data-added test signal, and are further configured to transmit the data-added test signal by wireless communication, and the transmission source device is further configured to receive the data-added test signal by wireless communication from any of the transmitting device and the transmission destination device, is further configured to determine a communication route between the transmission source device and the transmission destination device via the transmitting device with a shortest communication time from among potential communication routes based on the identification number and the receiving time of each of the transmission destination device and the transmitting device obtained from received data-added test signal, and is further configured to transmit the logic-circuit update data so that the logic-circuit update data is sent to the transmission destination device via the communication route,
and wherein the transmission source device is further configured to:
create communication route data based on the identification number and the receiving time of each of the transmission destination device and the transmitting device obtained from the received data-added test signal, the communication route data indicating an order of transmitting devices that are on the communication route and that are to transmit the logic-circuit update data; and
transmit the communication route data to the transmitting devices, and
each of the transmitting devices, upon receiving the logic-circuit update data, is configured to:
read information indicative of a next device to which the logic-circuit update data is to be transmitted from the communication route data; and
transmit the logic-circuit update data to the next device.

2. The wireless communication system according to claim 1, wherein each of the transmitting devices, upon receiving the logic-circuit update data, is configured to:
transmit an acknowledgement signal to a previous transmitting device from which the logic-circuit update data is received, the acknowledgement signal indicating that reception of the logic-circuit update data is completed; and
receive the acknowledgement signal from the next device, and if the acknowledgement signal is not received within a predetermined period, transmits to the transmission source device a negative acknowledgement signal, the negative acknowledgement signal indicating that data cannot be transmitted; and
the transmission source device, upon receiving the negative acknowledgement signal, is further configured to transmit a first test signal to determine a communication route between the transmission source device and the transmission destination device with a shortest communication time from among potential communication routes other than the communication route through which the negative acknowledgement signal is transmitted.

3. The wireless communication system according to claim 2, wherein the transmission source device determines a plurality of communication routes between the transmission source device and the transmission destination device, divides the logic-circuit update data into fragments as many as the communication routes, and transmits each of the fragments via a corresponding one of the communication routes, and the transmission destination device, upon receiving the fragments, combines the fragments thereby restoring the logic-circuit update data.

4. The wireless communication system according to claim 3, wherein the transmission source device divides the logic-circuit update data into fragments of different data sizes, and transmits a fragment having a smaller data size via a communication route having a lower communication time.

5. The wireless communication system according to claim 4, wherein the transmitting device stores therein a corresponding one of the fragments that has been transmitted as a log, the transmission destination device upon combining the fragments thereby restoring the logic-circuit update data, determines whether restored logic-circuit update data is valid, and if the restored logic-circuit update data is not valid, transmits re-transmission request data containing a problematic fragment to the transmitting device for requesting the transmitting device to re-transmit the corresponding fragment, the transmitting device, upon receiving the re-transmission request data, compares contents of the corresponding fragment stored therein with contents of the problematic fragment contained in the re-transmission request data, and determines whether the contents of the corresponding fragment and the problematic fragment contained in the re-transmission request data are same, when the contents of the corresponding fragment and the contents of the problematic fragment are not same, transmits the corresponding fragment to the transmission destination device, and when the contents of the corresponding fragment and the contents of the problematic fragment are same, transmits the re-transmission request data to a previous transmitting device from which the corresponding fragment has been received.

6. The wireless communication system according to claim 2, wherein the transmission source device determines a plurality of communication routes between the transmission source device and the transmission destination device, and transmits the logic-circuit update data via each of the communication routes, the transmitting device, upon receiving a plurality of pieces of the logic-circuit update data, compares contents of the pieces of the logic-circuit update data, and determines whether the contents of the pieces of the logic-circuit update data are same, when the contents of the pieces of the logic-circuit update data are same, reads information indicative of the next device from the communication route data, and transmits to the next device any one of the pieces of the logic-circuit update data as the logic-circuit update data, the transmission destination device, upon receiving a plurality of pieces of the logic-circuit update data, compares contents of the pieces of the logic-circuit update data, determines whether the contents of the pieces of the logic-circuit update data are same, and when the contents of the pieces of the logic-circuit update data are same, updates the existing logic-circuit data with any one of the pieces of the logic-circuit update data.

7. The wireless communication system according to claim 6, wherein the transmitting device stores therein the logic-circuit update data that has been transmitted as a log, when the contents of the pieces of the logic-circuit update data are not same, the transmitting device and the transmission destination device transmit a re-transmission request containing a corresponding one of the pieces of the logic-circuit update data to each of previous transmitting devices from which the pieces of the logic-circuit update data were received, and each of the previous transmitting devices, upon receiving the re-transmission request data, compares contents of the logic-circuit update data stored therein with contents of the logic-circuit update data contained in the re-transmission request data, determines whether the contents of the logic-circuit update data stored therein and the logic-circuit update data contained in the re-transmission request data are same, when the contents of the logic-circuit update data stored therein and the contents of the logic-circuit update data contained in the re-transmission request data are not same, transmits the logic-circuit update data stored therein to the transmission destination device or the transmitting device from which the re-transmission request data has been received, and when the contents of the logic-circuit update data stored therein and the contents of the logic-circuit update data contained in the re-transmission request data are same, transmits the re-transmission request data to the previous transmitting device.

8. The wireless communication system according to claim 6, wherein the transmission source device determines at least three communication routes between the transmission source device and the transmission destination device, and transmits the logic-circuit update data via each of the communication routes, if the transmitting device receives at least three pieces of the logic-circuit update data, the transmitting device compares contents of the pieces of the logic-circuit update data, determines whether the contents of the pieces of the logic-circuit update data are same, makes a group of pieces of received logic-circuit update data having same contents, selects a piece of the logic-circuit update data from among a largest group that includes largest number of pieces, reads information indicative of the next device from the communication route data, and transmits to the next device selected piece of the logic-circuit update as the logic-circuit update data, if the transmission destination device receives at least three pieces of the logic-circuit update data, the transmission destination device compares contents of the pieces of the logic-circuit update data, determines whether the contents of the pieces of the logic-circuit update data are same, makes a group of pieces of received logic-circuit update data having same contents, selects a piece of the logic-circuit update data from among a largest group that includes largest number of pieces, and updates the existing logic-circuit data with selected piece of the logic-circuit update.

9. The wireless communication system according to claim 6, wherein the transmitting device stores therein the logic-circuit update data that has been transmitted as a log, upon receiving logic-circuit update data that is same as stored logic-circuit update data via a communication route different from a communication route through which the stored logic-circuit update data has been received, compares contents of the stored logic-circuit update data with contents of received logic-circuit update data, determines whether the contents of the stored logic-circuit update data and the contents of the received logic-circuit update data are same, and when the contents of the stored logic-circuit update data and the contents of the received logic-circuit update data are same, does not transmit the received logic-circuit update data to the next device.

10. The wireless communication system according to claim 2, wherein the transmission destination device upon receiving logic-circuit update data, stores therein received logic-circuit update data, and upon receiving a start signal for updating the logic-circuit data from the transmission source device, updates the existing logic-circuit data with stored logic-circuit update data, and the transmission destination device includes a plurality of transmission destination devices, wherein after the transmission source device completes transmission of the logic-circuit update data to each of the transmission destination devices, the transmission source device adjusts a time of transmitting the start signal to each of the transmission destination devices based on the communication time, so that the start signal reaches each of the transmission destination devices at the same time.

11. The wireless communication system according to claim 1, wherein the transmission source device determines the communication route by repeatedly transmitting a test signal at a predetermined interval.

* * * * *